United States Patent [19]

Nagai

[11] Patent Number: 4,795,124

[45] Date of Patent: Jan. 3, 1989

[54] EXTRACTOR APPARATUS FOR REMOVING ARTICLES FROM ARTICLE FORMING MACHINES

[75] Inventor: Masashi Nagai, Gahanna, Ohio

[73] Assignee: The Snair Company, Hilliard, Ohio

[21] Appl. No.: 908,792

[22] Filed: Sep. 18, 1986

[51] Int. Cl.$^4$ .................. B29C 39/36; B29C 43/50; B29C 45/42

[52] U.S. Cl. .................. 249/66.1; 72/422; 164/344; 164/404; 249/68; 249/73; 425/135; 425/438; 425/554; 425/556; 425/436 R

[58] Field of Search ............ 164/344, 404; 249/66 R, 249/68, 73; 425/436, 438, 554, 556, 135

[56] References Cited

U.S. PATENT DOCUMENTS

| | | | |
|---|---|---|---|
| 3,765,474 | 10/1973 | Burton | 164/404 |
| 4,155,401 | 5/1979 | Ettore | 164/404 |
| 4,212,622 | 7/1980 | Kikuchi et al. | 425/556 |
| 4,343,584 | 10/1982 | Hudgins | 901/7 |
| 4,449,914 | 5/1984 | Schmidts et al. | 425/556 |
| 4,491,451 | 1/1985 | Willim | 72/422 |
| 4,534,006 | 8/1985 | Minucciani et al. | 901/7 |

FOREIGN PATENT DOCUMENTS 1777355  12/1972  Fed. Rep. of Germany .......... 901/7

Primary Examiner—Willard E. Hoag
Attorney, Agent, or Firm—Robert Watkins

[57] ABSTRACT

An article extracting means which is mounted on a carriage means which in turn is slidably mounted on the side of an article forming machine having two members movable relative to one another to form an article between them. A pivoted extractor arm in mounted on the carriage means to pivot in a vertical plane toward and away from the forming machine. An upper portion of the extractor arm carries an independently pivoted arm which may move in the same vertical plane as the extractor arm between at least two 180 degree opposed positions related to positioning gripping members carried thereby between an article gripping and an article release positions. The gripping members feature a construction wherein opposing jaw members are moved in a parallel direction toward and away from one another. One jaw member is actuated in a linear direction which via a rack and pinion arrangement cause the other jaw to move in parallel, but opposing direction. A quick manual release connection is also provided to permit the carriage means carrying the extractor arm to a position providing unobstructed and safe access to the casting die or mold for maintenance personnel.

7 Claims, 4 Drawing Sheets

EXTRACTOR APPARATUS FOR REMOVING ARTICLES FROM ARTICLE FORMING MACHINES

BACKGROUND

This invention relates generally to article handling devices and particularly to an article extracting apparatus for removal of an article from an article forming machine such as a die casting or molding machine.

In industrial die cast and molding machines, it is typical to use a machine to extract the formed articles from the article forming machine. The extracting process is synchronized with the operation of the forming machine to extend a gripping means between the spaced platens of the forming machine. The gripping means grasps the article and then is retracted from between the platens. Usually the article is then moved to a release position outside the forming machine for releasing the article into a conveyor belt or into a receptacle or quenching bath. Additional operations may also be provided to such apparatus which are actually industrial robots that may be programmed to automatically perform a series of complex operations.

Such additional operations may include spraying the mold cavities with air or a lubricant, detection of a missing part or the whole article, or other complex quality control functions.

Employing such extracting apparatus rather than manual effort is advantageous both in the cost and safety of the process. However, in spite of the many prior art extracting apparatus, most present significant disadvantages.

These prior machines are often too bulky and therefore require more space than is desirable or are very costly in order to have the capability to make the required movements necessary to perform the extraction task.

None of these prior machines provide an apparatus which is mounted to the forming machine in a manner in which it may be conveniently moved out of the way when the process is stopped for manual inspection, maintenance or repair of the plates or die of the forming machine.

SUMMARY OF INVENTION

The present invention relates generally to article extracting apparatus particularly for removal of articles from article forming machines such as die casting and molding machines. Such machines usually employ a fixed platen and a movable platen adapted to move toward and away from the fixed platen in repetitive cycles with an article being formed on each cycle.

In the preferred embodiment of the present invention, an article extracting apparatus includes a base or support frame which is fixedly mounted to the article forming machine and includes a pair of vertically spaced slide bars. A carriage frame is slidably mounted on the slide bars and forms a base upon which an extractor arm is pivotally mounted for rotation in a vertical plane. A second arm is mounted on the upper end of the extractor arm for movement therewith and also for independent pivoting movement in the same vertical plane and includes gripping means on the outer end thereof. This second arm is movable through an arc between at least two horizontal positions 180 degrees from one another and may be fixed in those and other positions independent of or in conjunction with the pivoted movement of the extractor arm.

This construction provides a very compact assembly wherein the gripping means may be moved in a vertical plane into the article forming machine to a position adjacent to the article to be removed when the platens are separated via the combined rotation of the extractor arm and the second arm carrying the gripping means. Then the carriage means carrying the extractor assembly is caused to slide laterally to permit the gripping means to grasp the article and then returned to its original position with the article securely grasped. Reversing the rotational movement of the extractor arm and secondary arm moves the article to a position outside the forming machine. While the extracting arm is held stationary in a predetermined position, the second arm continues to rotate to a 180 degree inverted position for release of the article. The article may be released onto a conveyor belt or into a quench tank as may be desired. The extraction is then repeated in synchronization with the cycle of the forming machine.

An additional feature is provided in the mechanism for controlling the slidable movement of the carriage means between the two predetermined positions described above. The drive linkage for initiating the movement of the carriage support includes a convenient release connection which, when manually disengaged, permits the carriage and the associated extractor assembly to be slidably moved away from the opening between the platens for manual access thereto. In this position, maintenance personnel are less likely to be injured by inadvertent operation of the extractor arm during such maintenance work.

The gripping means of the present invention is uniquely constructed to provide gripping jaws which operate to move in parallel opposing relationship to one another to provide a more secure grasping action. The drive mechanism features a slidable rack which carries one jaw and drives a rotary gear wheel which then drives a parallel rack carrying the other jaw in the opposite direction relative to the first jaw.

OBJECTS

It is therefore a primary object of the present invention to provide an article extracting apparatus which provides a relatively compact construction which can be mounted directly onto an article forming machine and requires a minimum of floor space in which to operate its tasks.

It is another object of the present invention to provide an apparatus of the type described which performs the movements necessary to the basic article extraction operation by using a pivoted extractor arm provided with another arm pivoted to its outer end for a combined arcuate movement into and out of the forming machine. Additionally, these arms are mounted on the slidable carriage support which cooperates with the arcuate movement described to provide the desired lateral movement of the article gripping means to grasp and remove the article from the forming machine.

It is a further object of the present invention to provide an apparatus of the type described wherein the second arm carrying the gripping means of the double pivot construction may be pivoted to an inverted 180 degree opposed position relative to the article grasping position for convenient release of the article for further processing as desired.

It is still another object of the present invention to provide an apparatus of the type described wherein a convenient manual release connection is provided to permit the carriage support to be slidably moved to an out of the way position relative to manual access to the opening of the forming machine.

It is yet a further object of the present invention to provide an apparatus of the type described which includes novel article gripping means having the jaws thereof move in a parallel relationship toward one another to obtain a more positive grip on the article.

Further objects and advantages of the present invention will be apparent from the following description, reference being had to the accompanying drawings wherein a preferred form of embodiment of the invention is clearly shown.

In The Drawings

Figure 4:
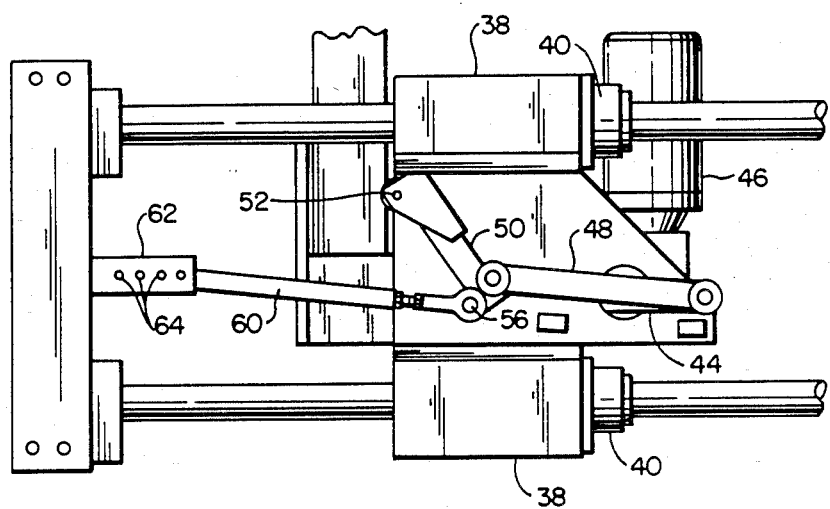
Figure 5:
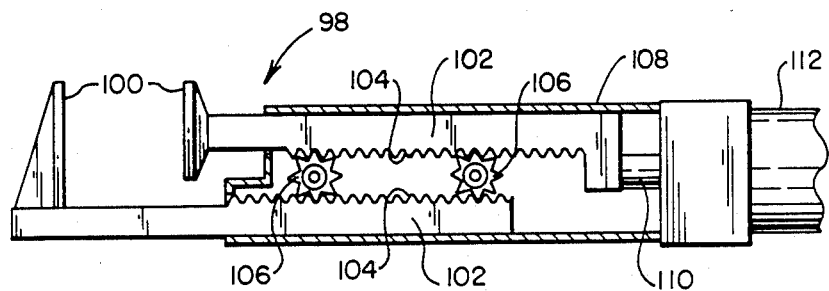

FIG. 4 is a partial rear elevational view of a portion of the apparatus shown in the preceding FIGS. illustrating the drive and linkage arrangement for causing lateral sliding movement of the article extracting apparatus of the present invention; and FIG. 5 is a partial side elevational view of a portion of the article extracting apparatus of the present invention illustrating the construction of the article gripping means.

DETAILED DESCRIPTION

Figure 1:
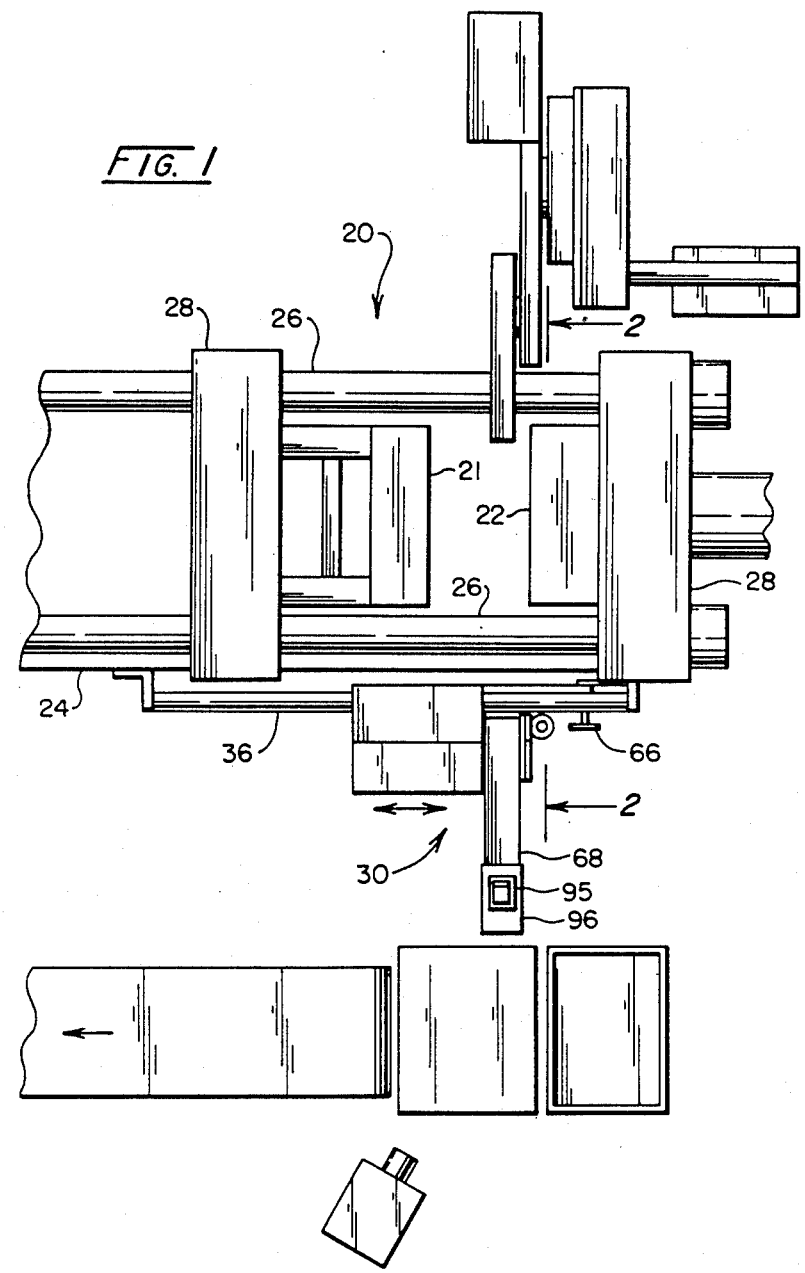
FIG. 1 is a top plan view of an article forming machine and an article extracting apparatus constructed in accordance with the present invention.
Figure 2:
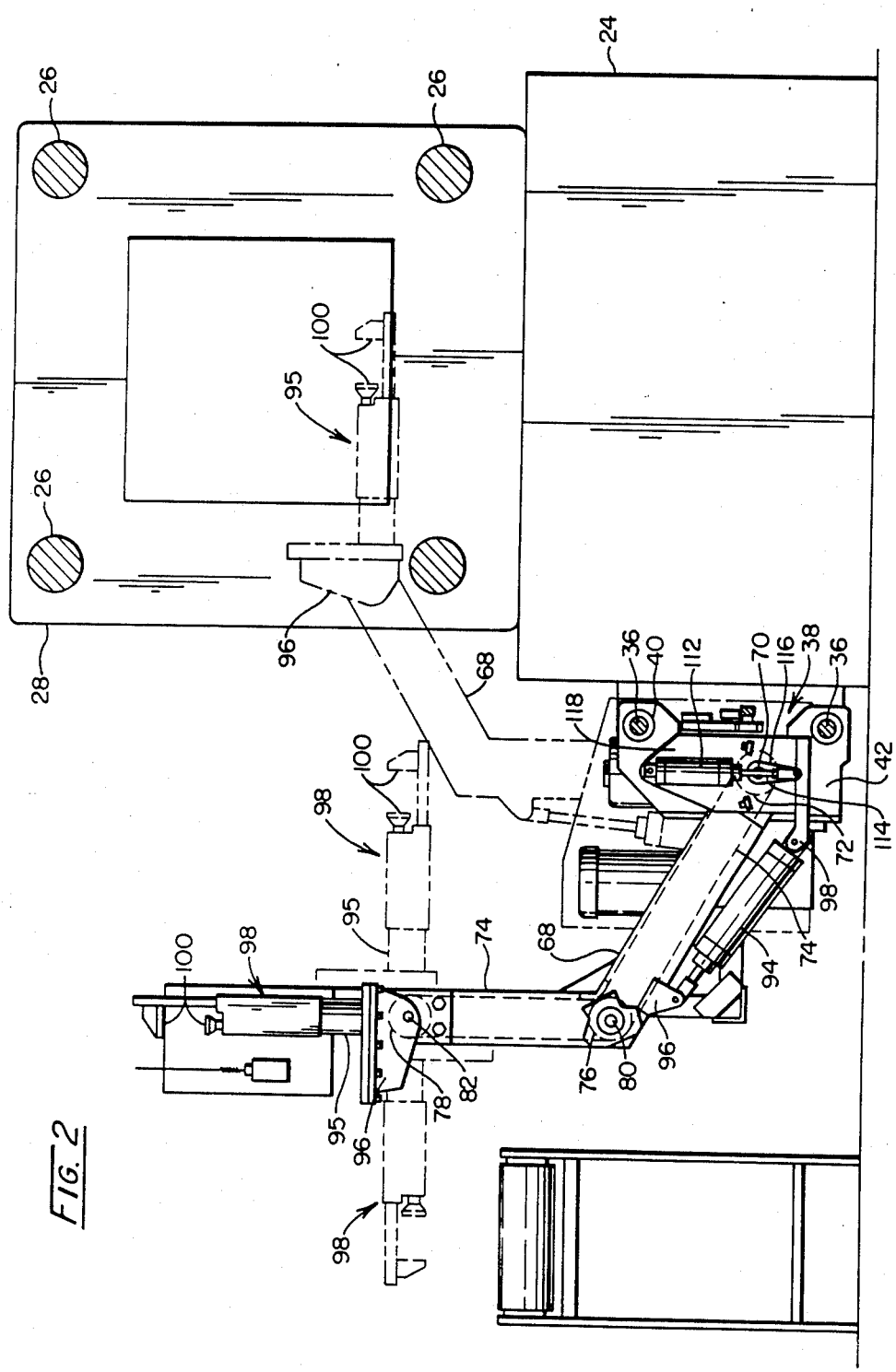
FIG. 2 is a side elevational view, in section, of the machine and apparatus shown in FIG. 1 taken along the line 2—2 in FIG. 1.
Figure 3:
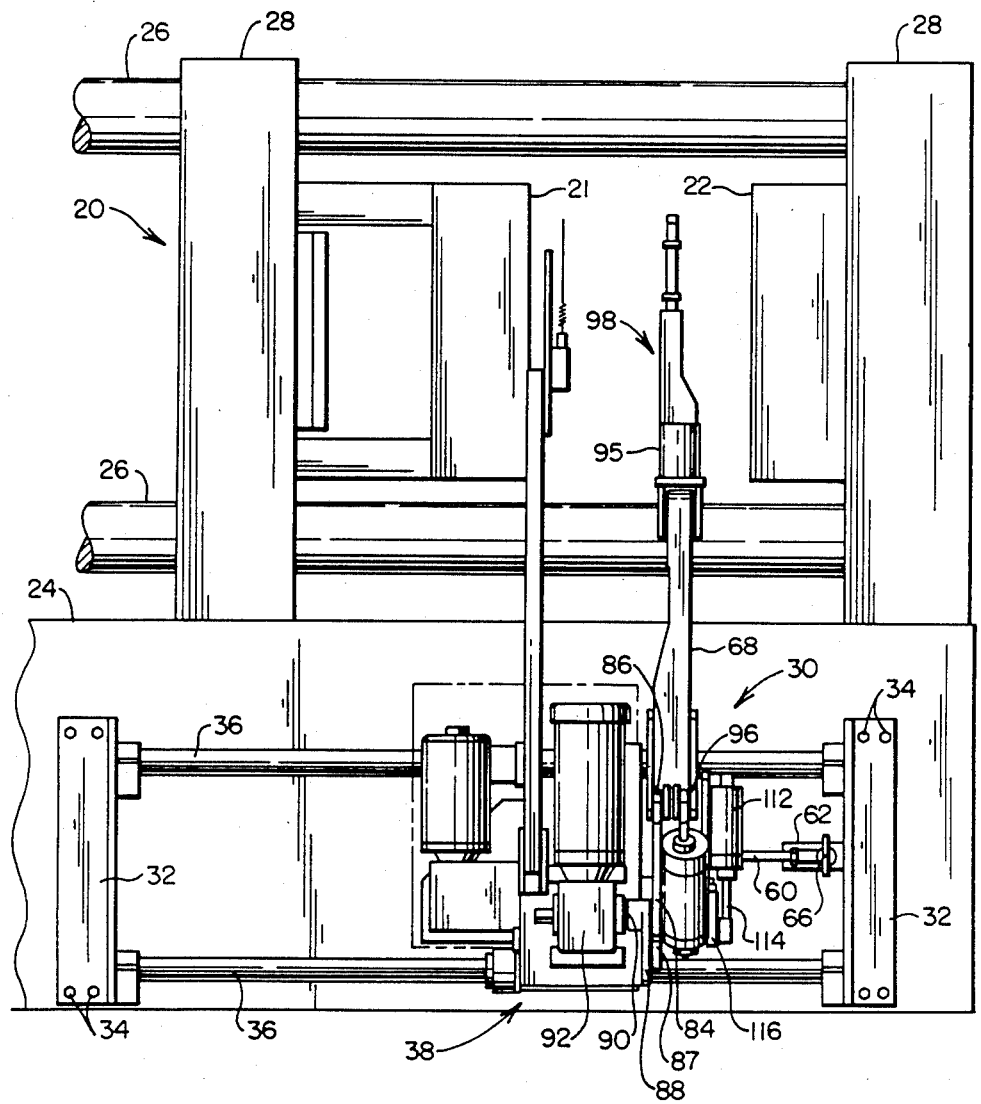
FIG. 3 is a front elevational view of the machine and apparatus of the preceding FIGS.

Referring now to the drawings, an article forming machine in combination with an article extracting apparatus constructed in accordance with the present invention is shown in FIGS. 1,2 and 3. The article forming machine indicated generally at 20, may be either a conventional die casting or injection molding machine which includes a fixed platen 21 and a movable platen 22. The movable platen 22 is adapted to move toward and away from fixed platen 21 in repetitive cycles with an article formed between the platens on each cycle in a well-known manner. The forming machine 20 is provided with a base support 24 fixed to the floor and conventional tie bars 26 that extend between spaced supports 28 of the machine.

The article extracting apparatus, generally indicated at 30, includes a support frame 32 which is fixed to the base 24 of the article forming machine 20 by bolts or the like, such as shown at 34. Frame 32 is provided with a pair of slide bars 36, vertically spaced from one another, which extend parallel to the direction of the movement of article forming members 21 and 22.

A carriage member 38 is provided upon which the various article extractor components are mounted which includes upper and lower bores through which slide bars 36 extend. Appropriate conventional bearings 40 are employed to slidably support carriage member on bars 36. Carriage member 38 includes side walls 42 supporting a floor upon which several components, electric motors and the pivoted extractor arm are carried as will be described in detail later herein.

Specifically referring to FIG. 4, the drive linkage for laterally moving carriage member 38 is shown. A rotating crank lever 44, conventionally mounted to an electric motor 46 mounted on member 38, is pivotally connected to a driving arm 48, which in turn, is pivotally connected to a link 50. Link 50 is pivotally connected at 52 to a rear wall 54 of member 38 and at 56 to link bar 60, which in turn, is connected to a strut 62 fixed to frame 32. This linkage operates such that rotation of crank 44 causes carriage member to slidably move in a lateral direction along slide bars 36. Drive motor 46 is controlled in a conventional manner to rotate lever 44 back and forth through only a portion of an arc to move the carriage 38 between two precise, lateral spaced positions related to the desired lateral positioning of the article extracting components carried on carriage member 38.

However, when it is desired to obtain unobstructed access to the casting area of the article forming machine, a quick disconnect feature is provided by releasing the engagement between the end of link bar 60 and strut 62. As best seen in FIGS. 3 and 4, strut 62 is provided with a plurality of threaded holes 64. The end of link bar 60 is provided with a hole through which a threaded connector, not shown, can extend through in alignment with a selected one of holes 64. The threaded connector may be easily manipulated manually by rotating the head 66, FIG. 3, to secure or remove it from the threaded hole 64 in which it is mounted. Upon disconnection from strut 62, the whole carriage member and the associated components mounted thereon may be slidably moved to the far left end of frame 32 to provide safe access to the opening of the article forming machine 20 which is created when members 21 and 22 move apart. This feature provides convenience for manual inspection or maintenance of the die or mold of the forming machine. More importantly, however, it provides safety to the worker from any inadvertent or accidental actuation of the extractor arm while the worker is in the area of the casting opening between article forming members 21 and 22.

Now referring specifically to FIGS. 2 and 3, carriage member 38 provides the support platform for an article extractor support arm 68 which is rotatably mounted on an axle or shaft 70 via a conventional bushing and bearing arrangement. As best seen in FIG. 2, arm 68 extends outwardly from forming machine 20 and includes an upper portion angled upwardly in a vertically steeper manner.

Shaft 70 is driven by an electric motor, not shown, mounted on carriage 38 and is also fixed to a drive sprocket 72 which carries a drive chain 74. Sprocket 72 and chain 74, along with an idler sprocket 76 and sprocket 78 are mounted on arm 68 and preferably are enclosed therein by conventional side plates. Sprockets 76 and 78 are conventionally mounted to arm 68 via shafts 80 and 82.

With reference to FIG. 3, a link rod 84 is pivotally mounted at one end, such as 86, to arm 68 and at the other end via pin 87 to a bell crank 88. Crank 88 is operatively connected to a shaft 90 driven by an electric motor 92. Upon rotation of shaft 90 and bell crank 88, arm 68 is caused to rotate about the axis of shaft 70. The piston of an air cylinder 94 is pivotally connected to a brace member 96 fixed to arm 68 and the cylinder 94 is pivoted to an ear 98 fixed to carriage support 38. Air cylinder 9- functions as a damping means to aid control of the movement of arm 68 and lend support for the forces applied during said movement.

A separate electric motor, not shown, which drives shaft 70 operates to rotate drive sprocket 72 which, via chain 74, causes rotation of sprocket 78 and the associated shaft 82. Therefore shaft 70 is rotated independent of rotation of shaft 90 which is driven by motor 92.

A second arm 95 is provided which may be fixed to a support base 96 in any conventional manner. Base 96 is fixed to shaft 82 for rotation with the shaft 82 and sprocket 78. Arm 95 is provided with an outwardly extending article gripping means indicated generally at 98, which includes a pair of movable jaw means 100.

As viewed in FIG. 2, arm 95 is rotatable through an arc of at least 180 degrees between the two horizontal positions shwon in ghost lines. In the preferred embodiment, the arm 95 assumes a vertical position, as seen in full lines in FIG. 2, when it is not operational which represents the highest vertical height of the extractor assembly with positioning arm 95 in an out of the way attitude for personnel moving through the area.

Preferably, arm 95 is first lowered from the vertical position to the horizontal position, seen on the right in ghost lines in FIG. 2, by actuation of the motor driving shaft 70 which is connected to driving sprocket 72. Next, actuation of the shaft 90 of motor 92 and bell crank 88 causes extractor support arm 68 to rotate upwardly to the position shown in ghost lines on the far right in FIG. 2, with arm 95 extended into article forming machine 20. During this rotation of arm 68, arm 95 is rotated in an opposing manner relative to the support arm 68 to maintain its relative horizontal position as it moves in between article forming machine members 21 and 22.

The independent rotation of arm 95 via rotation of shaft 70 is aided by the action of damping air cylinder 112 in a manner similar to the action and function of air cylinder 94.

The outer end of piston 114 of air cylinder 112 is pivotally connected to the lower end of a bell crank 116. Bell crank 116 is fixedly mounted on shaft 70 to rotate therewith. The upper end of cylinder 112 is pivotally connected to a vertically extending support frame 118 which is fixed to carriage member 38. Upon actuation of crank 116 by rotation of shaft 70, air cylinder 112 and piston 114 are actuated concurrently therewith to aid in damping the forces exerted during the independent movement of arm 94 to effect a smoother operation of the apparatus particularly at the horizontally extended positions.

The above described action is controlled by conventional electrical circuitry using well-known techniques which synchronize the electric motor driving means for shafts 70 and 90 in a timed sequence with the casting cycles of article forming machine 20 and also synchronize the actuation of the air cylinders 94 and 112 and the opening and closing of the gripping means 98.

With specific reference to FIG. 5, the gripping means 98 is shown. Jaws 100 are mounted on a respective one of slidably mounted linear racks or elongate bars 102 and 103 provided With teeth, such as at 104, which mesh With rotatably mounted gears or pinions 106. Racks 102 and 103 are conventionally mounted for sliding movement within a housing 108.

The upper rack 102 is operatively connected to a piston 110 of an air cylinder, not shown, which is mounted in a housing 112 of arm 95. Actuation of piston 110 causes upper rack 102 to slide outwardly as seen in FIG. 5, which in turn drives pinions 106 counterclockwise. Lower rack 103 is concurrently slidably moved in the opposite direction to move jaws 100 toward one antoehr. Upon the return stroke of piston 110, the action is reversed and jaws 100 are caused to move away from one another. Therefore an article disposed between the laws 100 may be grasped or released upon command.

The jaw 100 connected to lower rack 103 extends vertically upward to assure a horizontally aligned gripping area is presented to the sprue of an article to be grasped thereby. Also the racks 102 and 103 are vertically spaced in partially overlapping relationship to one another with the jaws extending outwardly from each rack in the same direction such that initiating parallel opposing motion of racks 102 and 103 cause simultaneous movement of each jaw. This action provides a more secure gripping action of the article and in connection with the above-described construction, represents a very economical mode of actuation of the jaws.

It should also be noted that upon rotation of arm 95 to the opposing 180 degree release position shown in ghost lines to the far left in FIG. 2, the inversion of jaw means 100 conveniently provides for release of an article.

In view of the foregoing description it should be readily understood that the article extracting apparatus constructed in accordance with the present invention provides a more compact and efficient mode of operation which includes improved article gripping means and advantageous safety features.

I claim:

1. In combination an article forming machine having two members movable relative to one another to form an article therebetween and an apparatus for removing the article so formed, said removal apparatus including: a frame means fixedly mounted to said article forming machine; an extractor arm means mounted on said frame means for movement through a vertical plane toward and away from said article forming machine, said extractor arm means including a single lower lever arm portion pivotally mounted on said frame means about a horizontal axis and an upper article extracting lever arm portion mounted to an upper end of said lower lever arm portion for movement with said lower lever arm portion upon pivoting of said lower lever arm and for selective rotation independent of said lower arm portion in a plane parallel to the plane of rotation of said lower lever arm portion between at least a first horizontal position disposed between said movable members of said article forming machine and a second horizontal position rotated 180 degrees relative to said first position and away from said article forming machine; an article gripping means disposed on the outer end of said upper lever arm portion; first drive means operatively connected to said lower arm portion for pivoting said lower portion and said upper arm portion; and second drive means operatively connected to said upper arm portion for pivoting said upper arm portion independent of said lower arm portion; and control means operatively connected to said first and second drive means for coordinating the pivotal movement of said lower and upper arm portions of said extractor arm means between said first and second horizontal positions.

2. The apparatus defined in claim 1 wherein said gripping means includes a support frame connected to and extending outwardly from said upper arm portion of said extractor arm; and a pair of laterally spaced jaw means slidably mounted to said support frame and extending outwardly therefrom; and actuating means to cause said jaw means to simultaneously move in opposing parallel direction relative to one another to alternatively grasp and release an article disposed between said jaw means.

3. The apparatus defined in claim 1 wherein said gripping means includes a support frame connected to said upper arm portion of said extractor arm, a pair of vertically spaced, parallel extending elongate bars provided with a plurality of longitudinally spaced teeth; a pinion rotatably mounted to said support frame and disposed between said elongate bars in operable engagement with the teeth of said bars, a jaw means mounted on the outer end of a respective one of said bars in laterally spaced and aligned relationship to one another; and means for linearly driving one of said elongated bars in a reciprocating manner to actuate the simultaneous movement of the other of said bars in an opposite direction relative to the driven bar to effect said jaws to move toward and away from one another.

4. The apparatus defined in claim 1 wherein said frame means includes a carriage support slidably mounted for horizontal movement on said frame means and wherein said lower arm portion of said extractor arm means is mounted to said support carriage; and third drive means operatively connected to said frame means and said support carriage for moving said support carriage and said extractor arm means between two predetermined horizontally spaced positions along said frame means, the first of said positions related to moving said gripping means into engaging alignment with an article formed in said forming machine and the second of said positions related to extracting said article therefrom.

5. The apparatus defined in claim 4 wherein said third driving means includes a plurality of linkage members interconnecting said carriage support to said frame means to define the limit of said two predetermined horizontally spaced positions; and wherein one of said linkage members is releasably connected between said frame means and said carriage support to permit said carriage and said extractor arm means to be moved beyond at least one of said horizontally spaced positions to provide unobstructed access to the area between the movable members of said article forming machine.

6. In combination, an article forming machine having two article forming members movable relative to one another to form an article therebetween and an article removal apparatus for removing the article so formed; said removal apparatus including a frame means fixedly mounted to said forming machine and provided with a vertically spaced pair of slide bars extending parallel to the direction of movement of said article forming members; a carriage support mounted for slidable movement on said slide bars; a vertically extending first arm member pivotally mounted at its lower end about a horizontal axis to said carriage support for movement toward and away from said forming machine; a second arm member pivotally mounted at one end to the upper portion of said first arm member about a horizontal axis parallel to the pivot axis of said first arm member and carrying an article gripping means extending outwardly from its opposing end, said second arm member being independently rotatable relative to said first arm between at least two releasably fixed horizontally disposed positions, a first of said positions defined with said gripping means extending between said two article forming members and a second of said positions defined with said gripping means extending away from said forming machine at least approximately 180 degrees opposed to said first position; first drive means for causing said first and second arm to pivot toward and away from said forming machine; second drive means for causing said second arm to pivot between said first and second positions; and third drive means for causing said carriage support to move along said slide bars between two predetermined, laterally spaced positions related to moving said gripping means into engaging alignment with an article formed in said forming machine and extracting said article therefrom.

7. The apparatus define in claim 6 wherein said third drive means includes a plurality of linkage means connecting said carriage support to said frame means and defining said two predetermined positions of said carriage support, at least one of said linkage means being releasably connected to one of said frame means or said carriage support for moving said carriage support to a third position providing unobstructed to an area between said article forming members.

* * * * *